United States Patent
Sato et al.

(10) Patent No.: US 10,684,176 B2
(45) Date of Patent: Jun. 16, 2020

(54) TEMPERATURE MEASUREMENT DEVICE USING STRAIN GAUGE

(71) Applicant: MINEBEA MITSUMI Inc., Nagano (JP)

(72) Inventors: Satoshi Sato, Fujisawa (JP); Masateru Kobayashi, Chigasaki (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 16/615,463

(22) PCT Filed: May 17, 2018

(86) PCT No.: PCT/JP2018/019017
§ 371 (c)(1),
(2) Date: Nov. 21, 2019

(87) PCT Pub. No.: WO2018/221231
PCT Pub. Date: Dec. 6, 2018

(65) Prior Publication Data
US 2020/0088587 A1 Mar. 19, 2020

(30) Foreign Application Priority Data

May 30, 2017 (JP) .................. 2017-106219

(51) Int. Cl.
*G01K 5/00* (2006.01)
*G01K 7/00* (2006.01)
*G01K 5/52* (2006.01)

(52) U.S. Cl.
CPC ....................... *G01K 5/52* (2013.01)

(58) Field of Classification Search
USPC ............... 374/187, 163, 183, 141, 142, 166
See application file for complete search history.

(56) References Cited

U.S. PATENT DOCUMENTS

| | | | | |
|---|---|---|---|---|
| 3,665,756 A | * | 5/1972 | Russell | G01L 1/2281 73/766 |
| 4,329,878 A | * | 5/1982 | Utner | G01L 1/2243 73/766 |
| 8,708,555 B2 | * | 4/2014 | Shipley | G01N 3/60 374/117 |

FOREIGN PATENT DOCUMENTS

| | | |
|---|---|---|
| JP | 57-103002 A | 6/1982 |
| JP | S61-30732 A | 2/1986 |

(Continued)

OTHER PUBLICATIONS

International Preliminary Report on Patentability for corresponding International Application No. PCT/JP2018/019017 dated Dec. 3, 2019.

(Continued)

*Primary Examiner* — Mirellys Jagan
(74) *Attorney, Agent, or Firm* — Pearne & Gordon LLP (57) ABSTRACT

There is provided a device for measuring a temperature of a metal object itself without being affected by an ambient temperature. A first invention provides a device for measuring a temperature of a metal object using at least one strain gauge, wherein the at least one strain gauge is attached to the metal object and a linear expansion coefficient of the strain gauge is different from a linear expansion coefficient of the metal object. A second invention provides a device for measuring a temperature of a metal object using two strain gauges, wherein the two strain gauges are attached to the metal object, directions of grids of the two strain gauges coincide with each other, a Wheatstone bridge circuit is formed using the two strain gauges, a linear expansion coefficient of a first strain gauge of the two strain gauges is larger than the linear expansion coefficient of the metal object and the linear expansion coefficient of a second strain (Continued)

gauge of the two strain gauges is smaller than the linear expansion coefficient of the metal object.

4 Claims, 6 Drawing Sheets

(56) References Cited

FOREIGN PATENT DOCUMENTS

| | | |
|---|---|---|
| JP | 04-095737 A | 3/1992 |
| JP | 2009-210282 A | 9/2009 |
| JP | 6535367 B | 6/2019 |

OTHER PUBLICATIONS

English translation of Written Opinion for corresponding International Application No. PCT/JP2018/019017 dated Aug. 21, 2018.
International Search Report for corresponding International Application No. PCT/JP2018/019017 dated Aug. 21, 2018.
Written Opinion for corresponding International Application No. PCT/JP2018/019017 dated Aug. 21, 2018.
Decision to Grant a Patent dated May 27, 2019 for corresponding Japanese Application No. 2017-106219.
First Chinese Office Action dated Feb. 21, 2020 for corresponding Chinese Application No. 201880026721.6 and English translation.
Second Chinese Office Action dated Apr. 16, 2020 for corresponding Chinese Application No. 201880026721.6 and English translation.

\* cited by examiner

TEMPERATURE MEASUREMENT DEVICE USING STRAIN GAUGE

TECHNICAL FIELD

The present invention relates to a device for measuring a temperature of a metal object using a strain gauge.

BACKGROUND ART

Temperature sensors such as a thermistor have been conventionally used for temperature measurement. For example, Patent Literature 1 discloses a temperature measurement device including a thermistor attached to an object to be measured, a measurement temperature detection circuit that detects a temperature of the object to be measured using a thermistor, a storage circuit that stores a reference thermal time constant and a reference thermal resistance of the thermistor in advance, an estimated temperature calculation circuit that calculates an estimated temperature of the thermistor based on the measurement temperature, the reference thermal time constant, and the reference thermal resistance, with respect to a predetermined amount of heat generation of the object to be measured, and a determination circuit that determines whether an absolute value of a temperature difference between the estimated temperature and the measurement temperature is equal to or smaller than a predetermined threshold.

DOCUMENT LIST

Patent Literature

Patent Literature 1: Japanese Patent Application Publication No. 2009-210282

SUMMARY OF INVENTION

Technical Problem

The thermistor is susceptible to the temperature of the surroundings (ambient temperature) of the object to be measured. Therefore, in the case where the ambient temperature rapidly rises despite a slow temperature rise of the object to be measured, the thermistor cannot measure the slow temperature rise accurately in some cases.

Thus, it is an object of the present invention to provide a device for measuring a temperature of a metal object itself without being affected by the ambient temperature.

In general, the strain gauge is temperature-compensated in consideration of thermal expansion of the object to be measured due to the ambient temperature.

When the strain gauge is attached to the object to be measured, an apparent strain $\varepsilon a$ due to the temperature expressed by the following expression appears from a difference between a linear expansion coefficient ($\lambda g$) of a metal resistor of the strain gauge and a linear expansion coefficient ($\lambda a$) of the object to be measured. Note that $\alpha g$ is a resistance temperature coefficient of the metal resistor forming the strain gauge, and K is a gauge factor.

$$\varepsilon a = \alpha g / K + (\lambda a - \lambda g)$$

The strain gauge is selected so that the apparent strain $\varepsilon a = 0$ is satisfied in the above expression.

For example, when the object to be measured is made of copper, the strain gauge for copper, the strain gauge being temperature-compensated according to the linear expansion coefficient of copper, is used but the strain gauge for iron, the strain gauge being temperature-compensated according to the linear expansion coefficient of iron, is not used.

Solution to Problem

A first invention provides a device for measuring a temperature of a metal object using at least one strain gauge, wherein
the at least one strain gauge is attached to the metal object, and
a linear expansion coefficient of the strain gauge is different from a linear expansion coefficient of the metal object.

In the first invention, it is preferable that
a Wheatstone bridge circuit is formed using two strain gauges,
a linear expansion coefficient of a first strain gauge of the two strain gauges is larger than the linear expansion coefficient of the metal object, and
a linear expansion coefficient of a second strain gauge of the two strain gauges is smaller than the linear expansion coefficient of the metal object.

In the first invention, it is preferable that
a Wheatstone bridge circuit is formed using four strain gauges,
a linear expansion coefficient of each of first and third strain gauges of the four strain gauges is larger than the linear expansion coefficient of the metal object, and
a linear expansion coefficient of each of second and fourth strain gauges of the four strain gauges is smaller than the linear expansion coefficient of the metal object.

A first embodiment of a second invention provides a device for measuring a temperature of a metal object using two strain gauges, wherein
the two strain gauges are attached to the metal object,
directions of grids of the two strain gauges coincide with each other,
a Wheatstone bridge circuit is formed using the two strain gauges,
a linear expansion coefficient of a first strain gauge of the two strain gauges is larger than a linear expansion coefficient of the metal object, and
the linear expansion coefficient of a second strain gauge of the two strain gauges is smaller than the linear expansion coefficient of the metal object.

A second embodiment of the second invention provides a device for measuring a temperature of a metal object using four strain gauges, wherein
the four strain gauges are attached to the metal object,
directions of grids of the four strain gauges coincide with one another,
a Wheatstone bridge circuit is formed using the four strain gauges,
a linear expansion coefficient of each of first and third strain gauges of the four strain gauges is larger than a linear expansion coefficient of the metal object, and
a linear expansion coefficient of each of second and fourth strain gauges of the four strain gauges is smaller than the linear expansion coefficient of the metal object.

DESCRIPTION OF EMBODIMENTS (First Invention)

Figure 1:
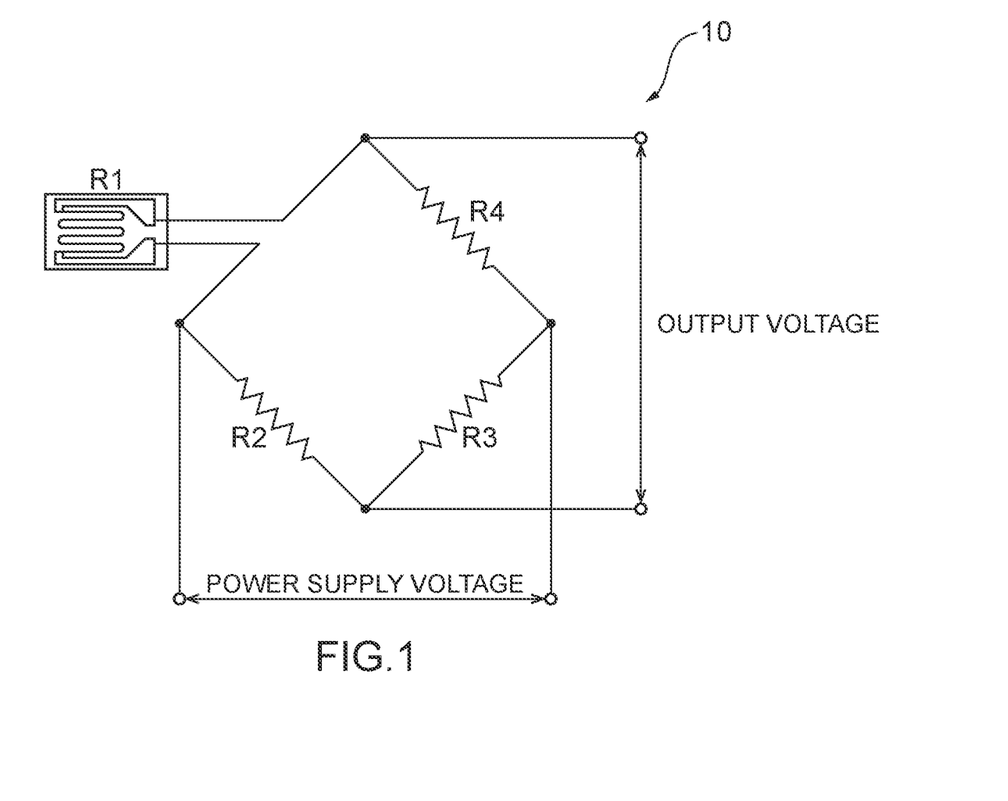
FIG. 1 A circuit diagram of a device according to a first embodiment of a first invention.

FIG. 1 is a circuit diagram of a device according to a first embodiment of a first invention.

A strain gauge R1 of a device 10 according to a first embodiment is attached to a metal object and forms a Wheatstone bridge circuit together with fixed resistors R2 to R4 (quarter bridge).

As described above, the general strain gauge is temperature-compensated by adjusting the linear expansion coefficient of the strain gauge to the linear expansion coefficient of the object to be measured.

On the other hand, in the first invention, the linear expansion coefficient of the strain gauge R1 is different from the linear expansion coefficient of the metal object. For example, when the metal object is made of copper, the strain gauge R1 for iron is used. Hereby, when the temperature changes, the strain gauge R1 changes (is stretched or compressed) differently than the metal object and therefore, the strain gauge R1 can measure the temperature change of the metal object.

The linear expansion coefficients of typical metals are as follows.

Iron: 11 ppm/° C.

Copper: 16.8 ppm/° C.

Aluminum: 23 ppm/° C.

The device 10 of the first invention can measure the temperature of the metal object itself without being affected by the ambient temperature. The device 10 can be patterned in an arbitrary shape. That is, since the device 10 can have a high degree of freedom in shape and be attached directly to the metal object having an arbitrary shape, the device 10 can measure the temperature regardless of the shape of the metal object. In a case of a large metal object, a plurality of devices 10 are attached to the metal object, so that the devices 10 can measure the temperature of the entire metal object.

Note that, in the first invention, the change of the metal object is caused only by the temperature change and a load or the like is not applied to the metal object.

Figure 2:
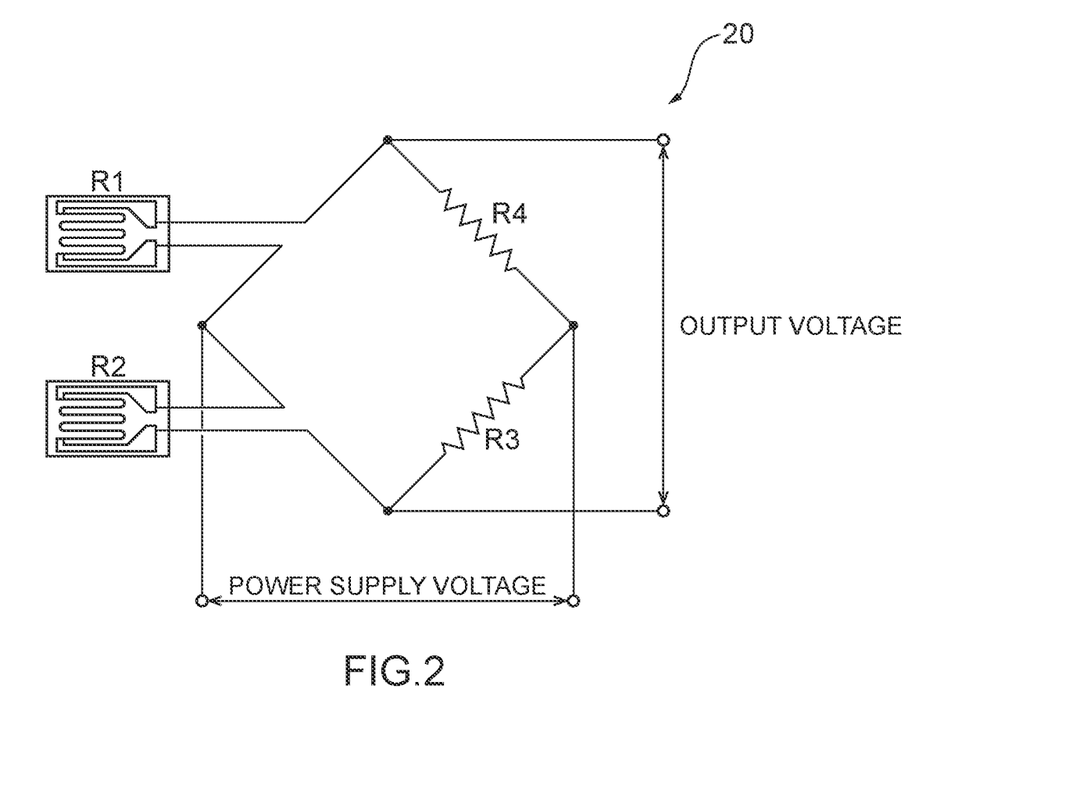
FIG. 2 A circuit diagram of a device according to a second embodiment of the first invention.

FIG. 2 is a circuit diagram of a device according to a second embodiment of the first invention.

A first strain gauge R1 and a second strain gauge R2 of a device 20 according to a second embodiment are attached to a metal object and form a half-bridge (Wheatstone bridge) circuit together with fixed resistors R3 and R4.

The linear expansion coefficient of the first strain gauge R1 is larger than the linear expansion coefficient of the metal object and the linear expansion coefficient of the second strain gauge R2 is smaller than the linear expansion coefficient of the metal object. For example, when the metal object is made of copper, a strain gauge for aluminum is used for the first strain gauge R1 and a strain gauge for iron is used for the second strain gauge R2. Thus, since the thermal strain to be output increases, the device 20 according to the second embodiment can measure the temperature change of the metal object with higher sensitivity than the device 10 according to the first embodiment.

Figure 3:
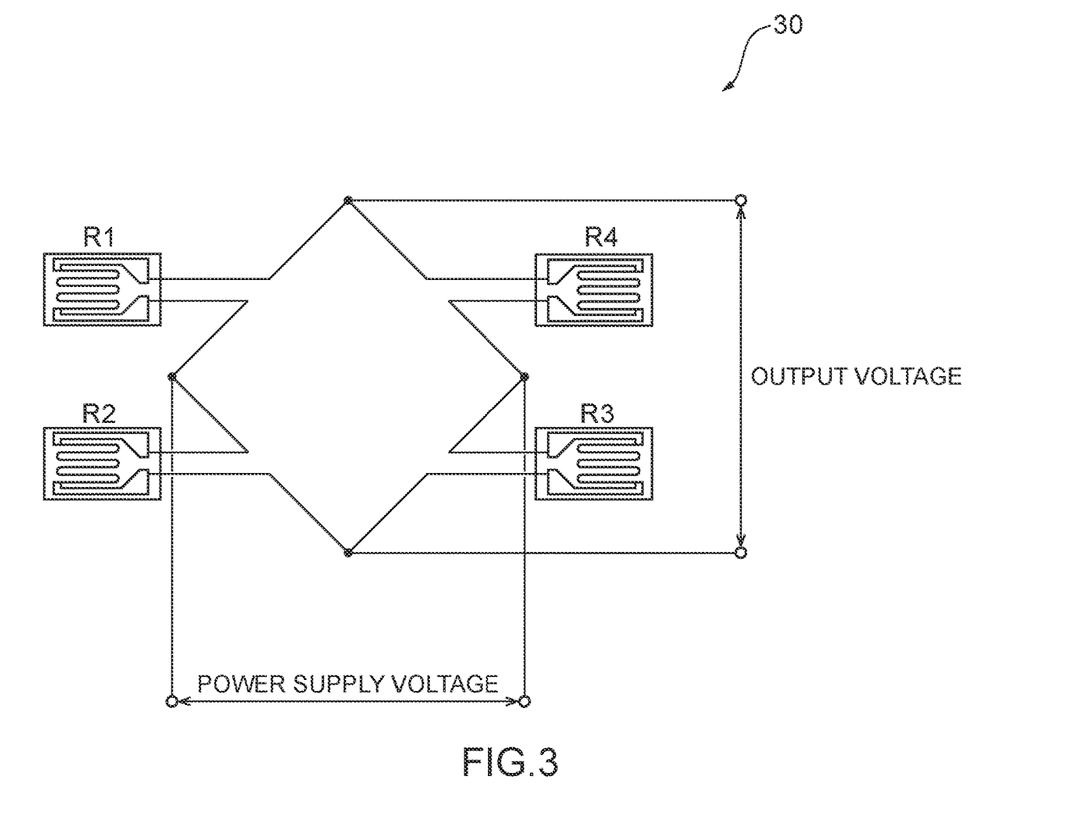
FIG. 3 A circuit diagram of a device according to a third embodiment of the first invention.

FIG. 3 is a circuit diagram of a device according to a third embodiment of the first invention.

A first strain gauge R1, a second strain gauge R2, a third strain gauge R3 and a fourth strain gauge R4 of a device 30 according to a third embodiment are attached to a metal object and form a full-bridge (Wheatstone bridge) circuit.

The linear expansion coefficient of each of the first and third strain gauges R1 and R3 is larger than the linear expansion coefficient of the metal object and the linear expansion coefficient of each of the second and fourth strain gauges R2 and R4 is smaller than the linear expansion coefficient of the metal object. For example, when the metal object is made of copper, a strain gauge for aluminum is used for each of the first and third strain gauges R1 and R3, and a strain gauge for iron is used for each of the second and fourth strain gauges R2 and R4. Thus, since the thermal strain to be output further increases, the device 30 according to the third embodiment can measure the temperature change of the metal object with higher sensitivity than the device 10 according to the first embodiment and the device 20 according to the second embodiment.

Note that, although the first strain gauge R1 and the third strain gauge R3 may be different from each other, and the second strain gauge R2 and the fourth strain gauge R4 may be different from each other, it is preferable that a difference between the linear expansion coefficient of each of the first and third strain gauges R1 and R3 and the linear expansion coefficient of the metal object is large, and a difference between the linear expansion coefficient of each of the second and fourth strain gauges R2 and R4 and the linear expansion coefficient of the metal object is large.

In the first invention described above, it is assumed that a load or the like is not applied to the metal object, but in the following description, it is assumed that a load or the like is applied to the metal object.

(Second Invention)

Figure 4:
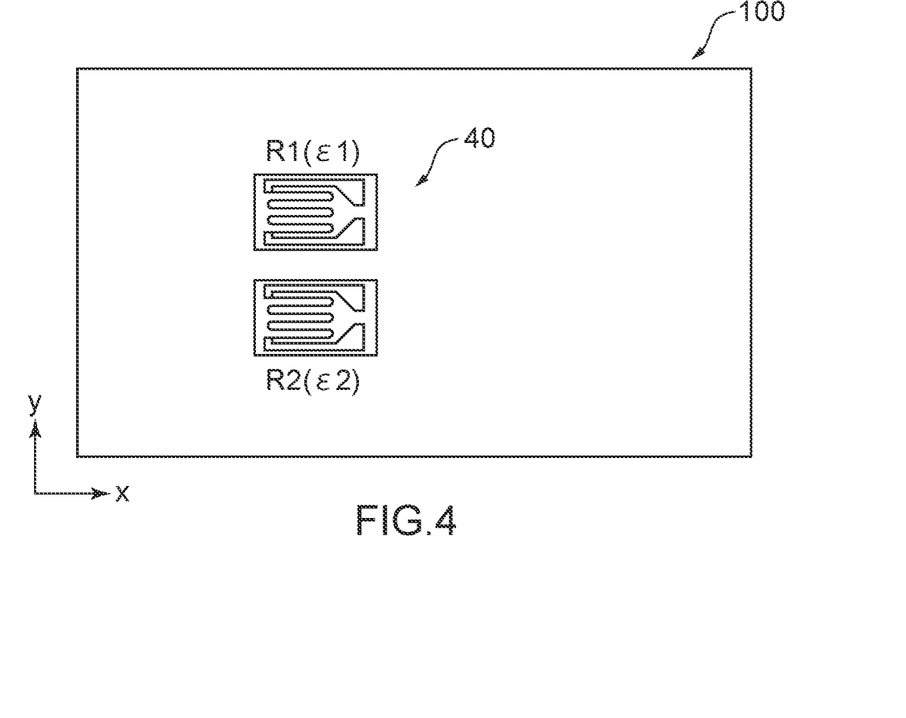
FIG. 4 A schematic diagram of a device according to a first embodiment of a second invention.

FIG. 4 is a schematic diagram of a device according to a first embodiment of a second invention.

A first strain gauge R1 and a second strain gauge R2 of a device 40 according to the first embodiment are attached to a plate-shaped metal object 100 in an x-y plane and form a half-bridge (Wheatstone bridge) circuit together with fixed resistors R3 and R4 (not illustrated). The grids of the first and second strain gauges R1 and R2 are directed in an x direction and therefore, the directions of the grids of the first and second strain gauges R1 and R2 coincide with each other.

When the strains (total strain=strain due to load or the like+thermal strain due to temperature change) detected by the first and second strain gauges R1 and R2 are $\varepsilon 1$ and $\varepsilon 2$, respectively, the total strain $\varepsilon$ detected by the half-bridge (Wheatstone bridge) circuit is expressed by the following Expression 1.

$$\varepsilon = \varepsilon 1 - \varepsilon 2 \quad \text{(Expression 1)}$$

When the load or the like and the temperature change are applied to the metal object 100, the strains due to the load or the like that are detected by the first and second strain gauges R1 and R2 are $\varepsilon 1\_s$ and $\varepsilon 2\_s$, respectively, and the thermal strains due to the temperature change that are detected by the first and second strain gauges R1 and R2 are $\varepsilon 1\_t$ and $\varepsilon 2\_t$, respectively. In this case, the following Expression 2 is established.

$$\varepsilon = (\varepsilon 1\_s + \varepsilon 1\_t) - (\varepsilon 2\_s + \varepsilon 2\_t) \quad \text{(Expression 2)}$$

Since the directions of the grids of the first and second strain gauges R1 and R2 coincide with each other, by substituting ε1_s=ε2_s in Expression 2, the following Expression 3 is established.

$$\varepsilon = \varepsilon1\_t - \varepsilon2\_t \quad \text{(Expression 3)}$$

As is clear from Expression 3, even when the load or the like is applied to the metal object 100, the strains due to the load or the like are cancelled and therefore, the device 40 can detect only the temperature change of the metal object 100.

The linear expansion coefficient of each of the first and second strain gauges R1 and R2 is different from the linear expansion coefficient of the metal object, the linear expansion coefficient of the first strain gauge R1 is larger than the linear expansion coefficient of the metal object, and the linear expansion coefficient of the second strain gauge R2 is smaller than the linear expansion coefficient of the metal object. In this way, ε1_t>0 and ε2_t<0 are established, and in Expression 3 the total strain ε increases and therefore, measurement with high sensitivity can be achieved.

Note that, in general, when a half-bridge (Wheatstone bridge) circuit is formed, the direction of grid of the first strain gauge R1 is perpendicular to the direction of grid of the second strain gauge R2. One of the strain gauges detects the tensile strain and the other strain gauge detects the compressive strain.

Figure 5:
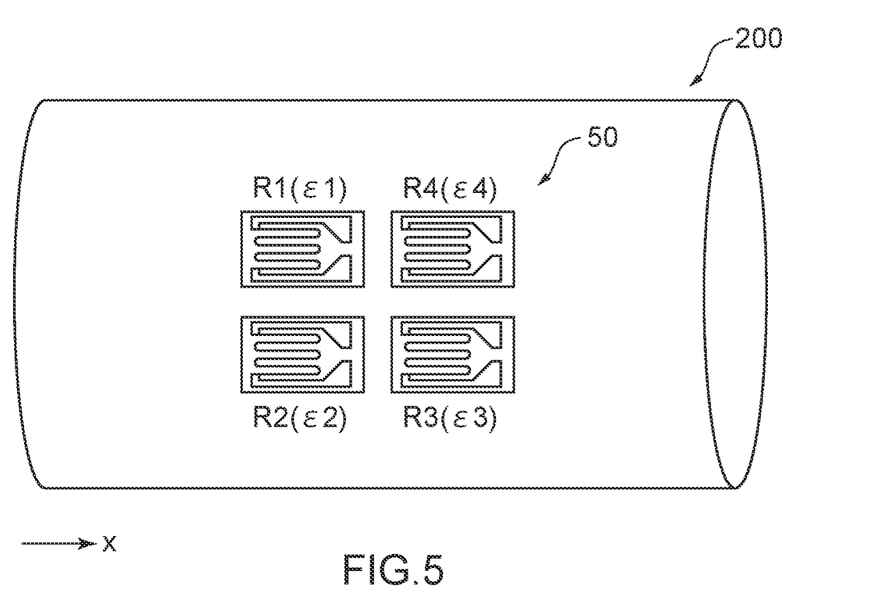
FIG. 5 A schematic diagram of a device according to a second embodiment of the second invention.

FIG. 5 is a schematic diagram of a device according to a second embodiment of the second invention.

A first strain gauge R1, a second strain gauge R2, a third strain gauge R3 and a fourth strain gauge R4 of a device 50 according to the second embodiment are attached to a side surface of a metal object 200 having a cylindrical shape and form a full-bridge (Wheatstone bridge) circuit. The grids of the first to fourth strain gauges R1 to R4 are directed in an x direction and therefore, the directions of the grids of the first to fourth strain gauges R1 to R4 coincide with one another.

When the strains (total strain=strain due to load or the like+thermal strain due to temperature change) detected by the first to fourth strain gauges R1 to R4 are ε1 to ε4, respectively, the total strain ε detected by the full-bridge (Wheatstone bridge) circuit is expressed by the following Expression 4.

$$\varepsilon = \varepsilon1 - \varepsilon2 + \varepsilon3 - \varepsilon4 \quad \text{(Expression 4)}$$

As in the case of the half-bridge (Wheatstone bridge) circuit described above, the load applied to the metal object 200 is cancelled and therefore, when the thermal strains due to the temperature change that are detected by the first to fourth strain gauges R1 to R4 are ε1_t to ε4_t, respectively, the following Expression 5 is established.

$$\varepsilon = \varepsilon1\_t - \varepsilon2\_t + \varepsilon3\_t - \varepsilon4\_t \quad \text{(Expression 5)}$$

The linear expansion coefficient of each of the first to fourth strain gauges R1 to R4 is different from the linear expansion coefficient of the metal object, the linear expansion coefficient of each of the first and third strain gauges R1 and R3 is larger than the linear expansion coefficient of the metal object, and the linear expansion coefficient of each of the second and fourth strain gauges R2 and R4 is smaller than the linear expansion coefficient of the metal object. In this way, ε1_t, ε3_t>0 and ε2_t, ε4_t<0 are established, and in Expression 5 the total strain ε increases.

In the device 50 according to the second embodiment, even when the load or the like is applied to the metal object 200, the strains due to the load or the like are cancelled and therefore, the device 50 can detect only the temperature change of the metal object 200 with higher sensitivity than the device 40 according to the first embodiment.

Note that in the above-described embodiment, the grids of the strain gauges are directed in an x-direction, but the grids of a plurality of strain gauges can be directed in any direction so long as the directions of the grids of the strain gauges coincide with one another.

Example

Hereinafter, the present invention will be described using an example, but the present invention is not limited to this example.

Figure 6:
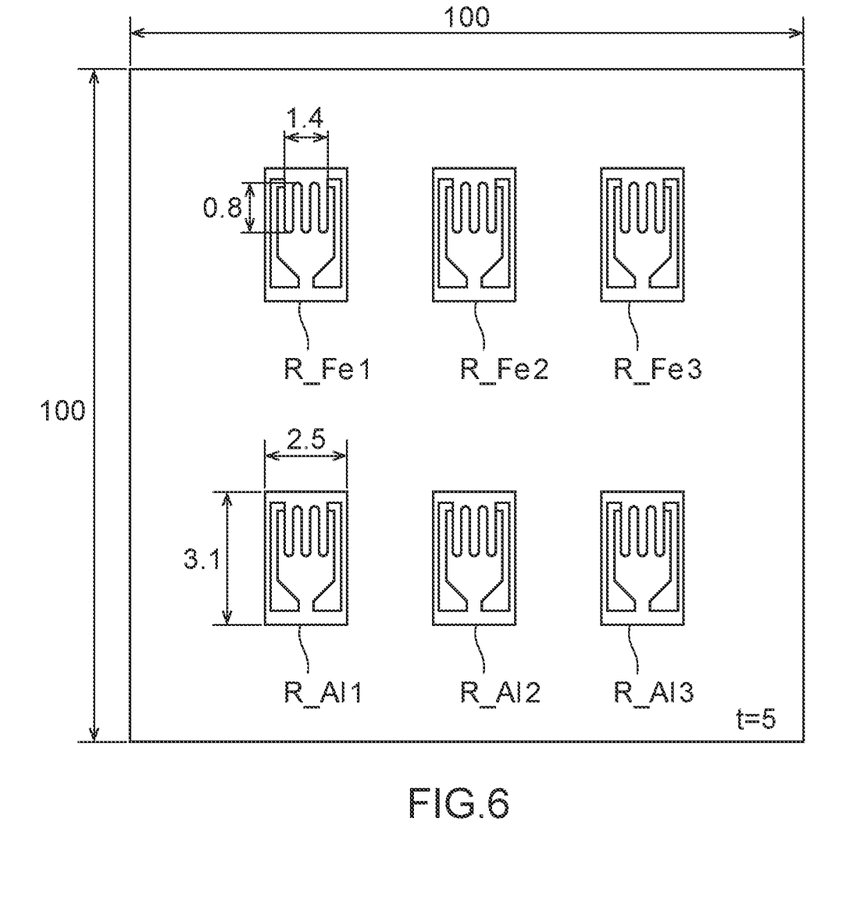
FIG. 6 A diagram for explaining an example.

As illustrated in FIG. 6, a copper plate having a length of 100 mm, a width of 100 mm and a thickness (t) of 5 mm (linear expansion coefficient: 16.8 ppm/° C.) was prepared, and a total of six strain gauges of the first and second samples were attached to any positions of the copper plate. The strain gauge had a grid length of 0.8 mm and a grid width of 1.4 mm as well as a base length 3.1 mm and a base width 2.5 mm.

The first samples were three strain gauges for Fe denoted as R_Fe1, R_Fe2 and R_Fe3, and the linear expansion coefficient thereof was set to 11 ppm/° C.

The second samples were three strain gauges for Al denoted as R_Al1, R_Al2 and R_Al3, and the linear expansion coefficient thereof was set to 23 ppm/° C.

Figure 7:
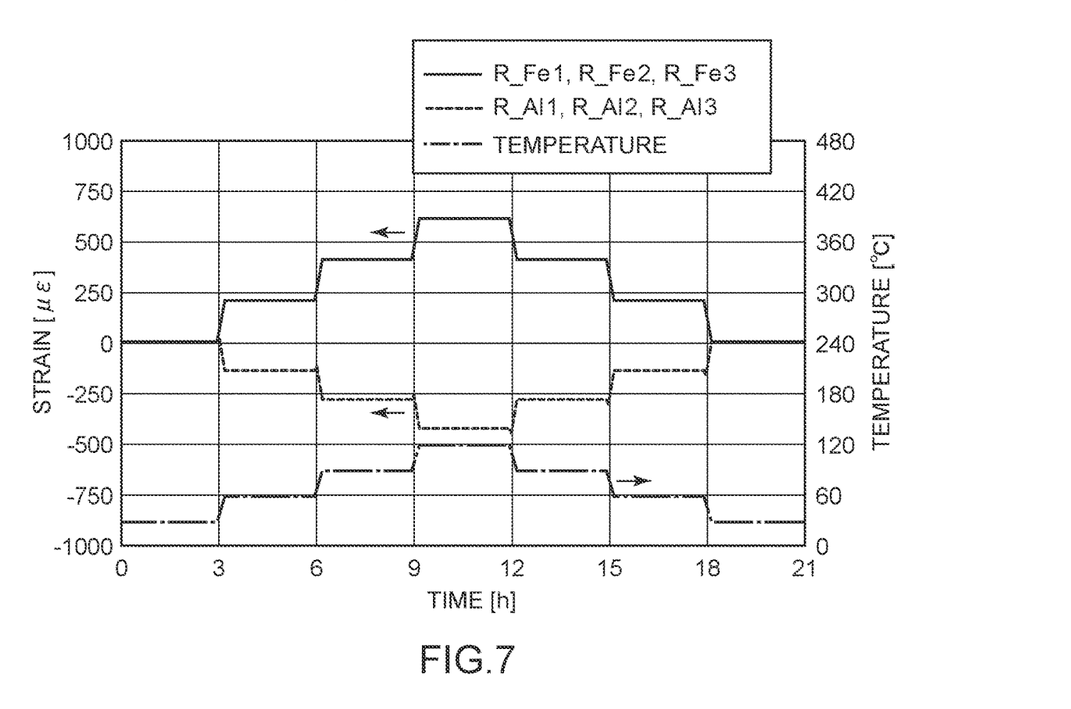
FIG. 7 A graph showing results of the example.

As indicated by a chain line in FIG. 7, the thermal strain was measured with the temperature cycle from 30 to 60 to 90 to 120 to 90 to 60 to 30° C. (three hours for each temperature step).

FIG. 7 shows measurement results of the thermal strain of each strain gauge due to the temperature change.

In FIG. 7, the measurement results of the three strain gauges for Fe denoted as R_Fe1, R_Fe2 and R_Fe3 are equivalent and shown by a solid line to show the tensile side strains. The measurement results of the three strain gauges for Al denoted as R_Al1, R_Al2 and R_Al3 are equivalent and shown by a dashed line to show the compressive side strains. The graph shows that both of the strains follow the temperature change.

Table 1 shows the above-described measurement results and calculation outputs when two strain gauges for Fe and two strain gauges for Al form a full-bridge (Wheatstone bridge) circuit.

TABLE 1

| | Temperature [° C.]/time | | | | | | |
|---|---|---|---|---|---|---|---|
| | 30/1.5 h | 60/4.5 h | 90/7.5 h | 120/10.5 h | 90/13.5 h | 60/16.5 h | 30/19.5 h |
| Thermal strain [με] of R_Fe1 | 0 | 220 | 405 | 620 | 415 | 220 | 0 |
| Thermal strain [με] of R_Fe2 | 0 | 220 | 405 | 620 | 415 | 220 | 0 |

TABLE 1-continued

| | Temperature [° C.]/time | | | | | | |
|---|---|---|---|---|---|---|---|
| | 30/1.5 h | 60/4.5 h | 90/7.5 h | 120/10.5 h | 90/13.5 h | 60/16.5 h | 30/19.5 h |
| Thermal strain [με] of R_Fe3 | 0 | 220 | 405 | 620 | 415 | 220 | 0 |
| Thermal strain [με] of R_Al1 | 0 | −135 | −285 | −400 | −280 | −130 | 0 |
| Thermal strain [με] of R_Al2 | 0 | −135 | −285 | −400 | −280 | −130 | 0 |
| Thermal strain [με] of R_Al3 | 0 | −135 | −285 | −400 | −280 | −130 | 0 |
| Full bridge (calculated value) [με] | 0 | 710 | 1380 | 2040 | 1390 | 700 | 0 |
| Full bridge (calculated value) [mV/V] | 0.00 | 0.36 | 0.69 | 1.02 | 0.70 | 0.35 | 0.00 |

Figure 8:
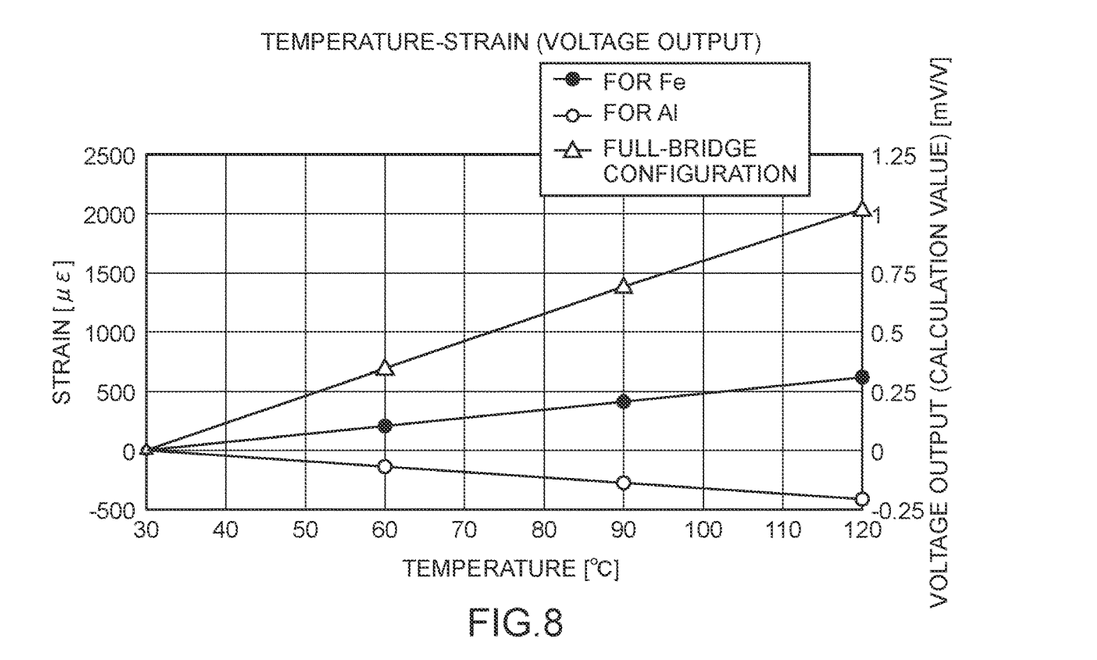
FIG. 8 A graph showing a temperature-strain (output voltage) curve.

FIG. 8 shows a temperature-strain (output voltage) curve in which the horizontal axis represents a temperature, the vertical axis on the left represents a strain and the vertical axis on the right represents a voltage output. The conversion from the strain to the voltage output was performed by expressing 2000με by 1 mV.

When a value at 120° C. (temperature difference 90° C.) is used as rating (reference), the non-linearity was about 4% R.O., and the hysteresis and return-to-zero were less than 0.5% R.O.

A measurable level of output relative to the temperature could be obtained by combining the strain gauge for Al having a linear expansion coefficient larger than the linear expansion coefficient of copper and the strain gauge for Fe having a linear expansion coefficient smaller than the linear expansion coefficient of copper instead of the strain gauge for copper, which was temperature-compensated according to the linear expansion coefficient of copper (225με/10° C.=0.11 mV/V/10° C.).

When a difference in the linear expansion coefficient between copper and aluminum is +6 ppm/° C. and a difference in the linear expansion coefficient between copper and iron is −6 ppm/° C., in the full-bridge configuration, the theoretical value is 240με/° C. Therefore, a result close to the measured value (225με/10° C.) was obtained (difference between the theoretical value and the measured value is about 7%).

As obvious from the example described above, it has been found that the temperature of the metal object can be measured using the strain gauge.

The invention claimed is:

1. A device for measuring a temperature of a metal object using two strain gauges, wherein
   the two strain gauges are attached to the metal object,
   a Wheatstone bridge circuit is formed using the two strain gauges,
   a linear expansion coefficient of a first strain gauge of the two strain gauges is larger than a linear expansion coefficient of the metal object, and
   a linear expansion coefficient of a second strain gauge of the two strain gauges is smaller than the linear expansion coefficient of the metal object.

2. A device for measuring a temperature of a metal object using four strain gauges, wherein
   the four strain gauges are attached to the metal object,
   a Wheatstone bridge circuit is formed using the four strain gauges,
   a linear expansion coefficient of each of first and third strain gauges of the four strain gauges is larger than a linear expansion coefficient of the metal object, and
   a linear expansion coefficient of each of second and fourth strain gauges of the four strain gauges is smaller than the linear expansion coefficient of the metal object.

3. A device for measuring a temperature of a metal object using two strain gauges, wherein
   the two strain gauges are attached to the metal object,
   directions of grids of the two strain gauges coincide with each other,
   a Wheatstone bridge circuit is formed using the two strain gauges,
   a linear expansion coefficient of a first strain gauge of the two strain gauges is larger than a linear expansion coefficient of the metal object, and
   a linear expansion coefficient of a second strain gauge of the two strain gauges is smaller than the linear expansion coefficient of the metal object.

4. A device for measuring a temperature of a metal object using four strain gauges, wherein
   the four strain gauges are attached to the metal object,
   directions of grids of the four strain gauges coincide with one another,
   a Wheatstone bridge circuit is formed using the four strain gauges,
   a linear expansion coefficient of each of first and third strain gauges of the four strain gauges is larger than a linear expansion coefficient of the metal object, and
   a linear expansion coefficient of each of second and fourth strain gauges of the four strain gauges is smaller than the linear expansion coefficient of the metal object.

* * * * *